(12) United States Patent
Surace et al.

(10) Patent No.: US 11,898,450 B2
(45) Date of Patent: Feb. 13, 2024

(54) FLOWPATH ASSEMBLY FOR GAS TURBINE ENGINE

(71) Applicant: RAYTHEON TECHNOLOGIES CORPORATION, Farmington, CT (US)

(72) Inventors: Raymond Surace, Newington, CT (US); San Quach, Southington, CT (US); Bryan P. Dube, Columbia, CT (US)

(73) Assignee: RTX CORPORATION, Farmington, CT (US)

( * ) Notice: Subject to any disclaimer, the term of this patent is extended or adjusted under 35 U.S.C. 154(b) by 80 days.

(21) Appl. No.: 17/323,436

(22) Filed: May 18, 2021

(65) Prior Publication Data

US 2022/0372888 A1 Nov. 24, 2022

(51) Int. Cl.
| | |
|---|---|
| *F01D 11/12* | (2006.01) |
| *F01D 5/28* | (2006.01) |
| *F01D 5/14* | (2006.01) |
| *F01D 25/12* | (2006.01) |

(52) U.S. Cl.
CPC .............. *F01D 11/12* (2013.01); *F01D 5/282* (2013.01); *F01D 5/147* (2013.01); *F01D 25/12* (2013.01); *F05D 2220/323* (2013.01); *F05D 2240/11* (2013.01); *F05D 2240/125* (2013.01); *F05D 2300/20* (2013.01); *F05D 2300/6033* (2013.01)

(58) Field of Classification Search
CPC ....... F01D 11/12; F01D 5/147; F05D 2240/11
See application file for complete search history.

(56) References Cited

U.S. PATENT DOCUMENTS

| | | | |
|---|---|---|---|
| 4,655,682 A | 4/1987 | Kunz et al. | |
| 6,530,744 B2 | 3/2003 | Liotta et al. | |
| 6,595,747 B2 | 7/2003 | Bos | |
| 7,824,152 B2 * | 11/2010 | Morrison | .............. F01D 25/246 |
| | | | 415/200 |
| 8,206,100 B2 | 6/2012 | Schuler et al. | |
| 9,803,494 B2 * | 10/2017 | Stricker | .................. F01D 11/12 |
| 10,378,770 B2 | 8/2019 | Reynolds et al. | |
| 10,385,709 B2 * | 8/2019 | Reynolds | ................ F01D 9/044 |

(Continued)

OTHER PUBLICATIONS

European Search Report for European Patent Application No. 22174155 dated Jul. 7, 2022.

*Primary Examiner* — Michael L Sehn
(74) *Attorney, Agent, or Firm* — Carlson, Gaskey & Olds, P.C.

(57) ABSTRACT

An assembly for a gas turbine engine includes, among other things, an end wall including a main body extending between a first end portion and a second end portion to establish a seal face. The end wall includes a first attachment portion dimensioned to fixedly attach the main body to a static structure at a first attachment point. An airfoil extends radially inwardly from the end wall relative to an assembly axis. The airfoil includes an inner cavity extending between a first end portion and a second end portion, the first end portion adjacent the end wall of the airfoil. A spar member includes a spar body extending between a first end portion and a second end portion. The spar body extends at least partially through the inner cavity. The first end portion of the end wall is cantilevered from the first attachment point.

25 Claims, 12 Drawing Sheets

(56) References Cited

U.S. PATENT DOCUMENTS

| | | |
|---|---|---|
| 10,822,973 B2 | 11/2020 | Parvis et al. |
| 2010/0132374 A1 | 6/2010 | Manteiga et al. |
| 2019/0345833 A1 | 11/2019 | Thorton |
| 2020/0173302 A1 | 6/2020 | Munsell et al. |
| 2020/0340365 A1* | 10/2020 | Whittle .................. F01D 5/282 |
| 2021/0123352 A1 | 4/2021 | Townes et al. |

* cited by examiner

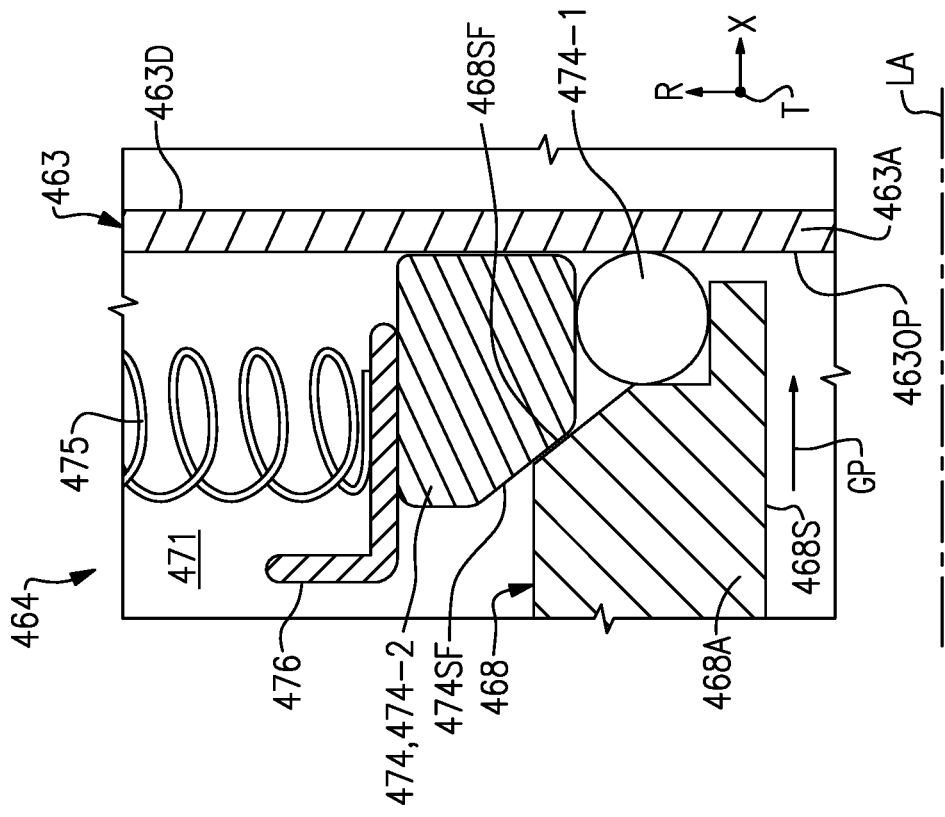
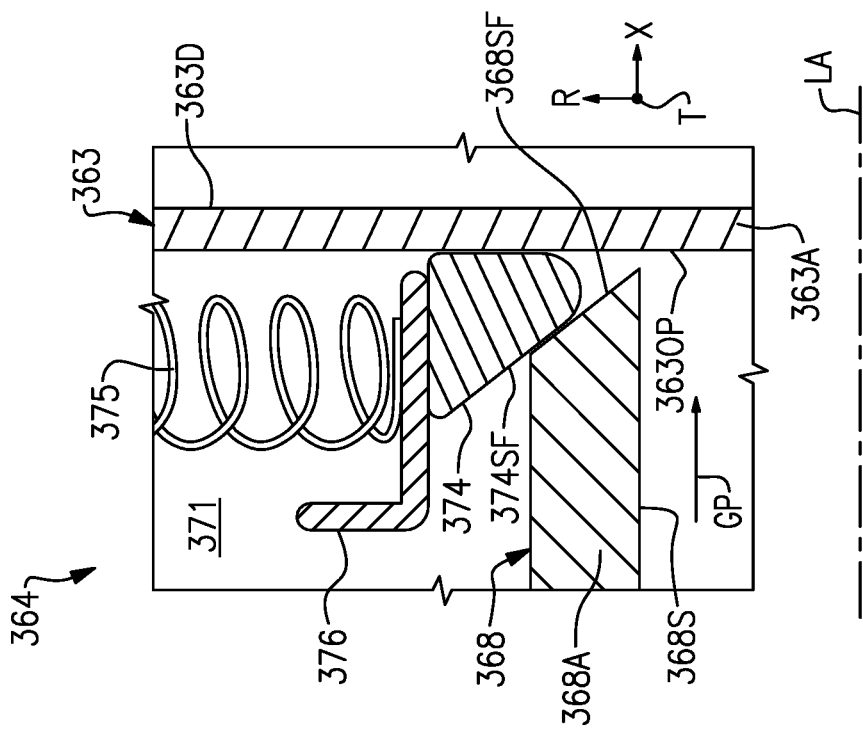
FIG.9
FIG.8

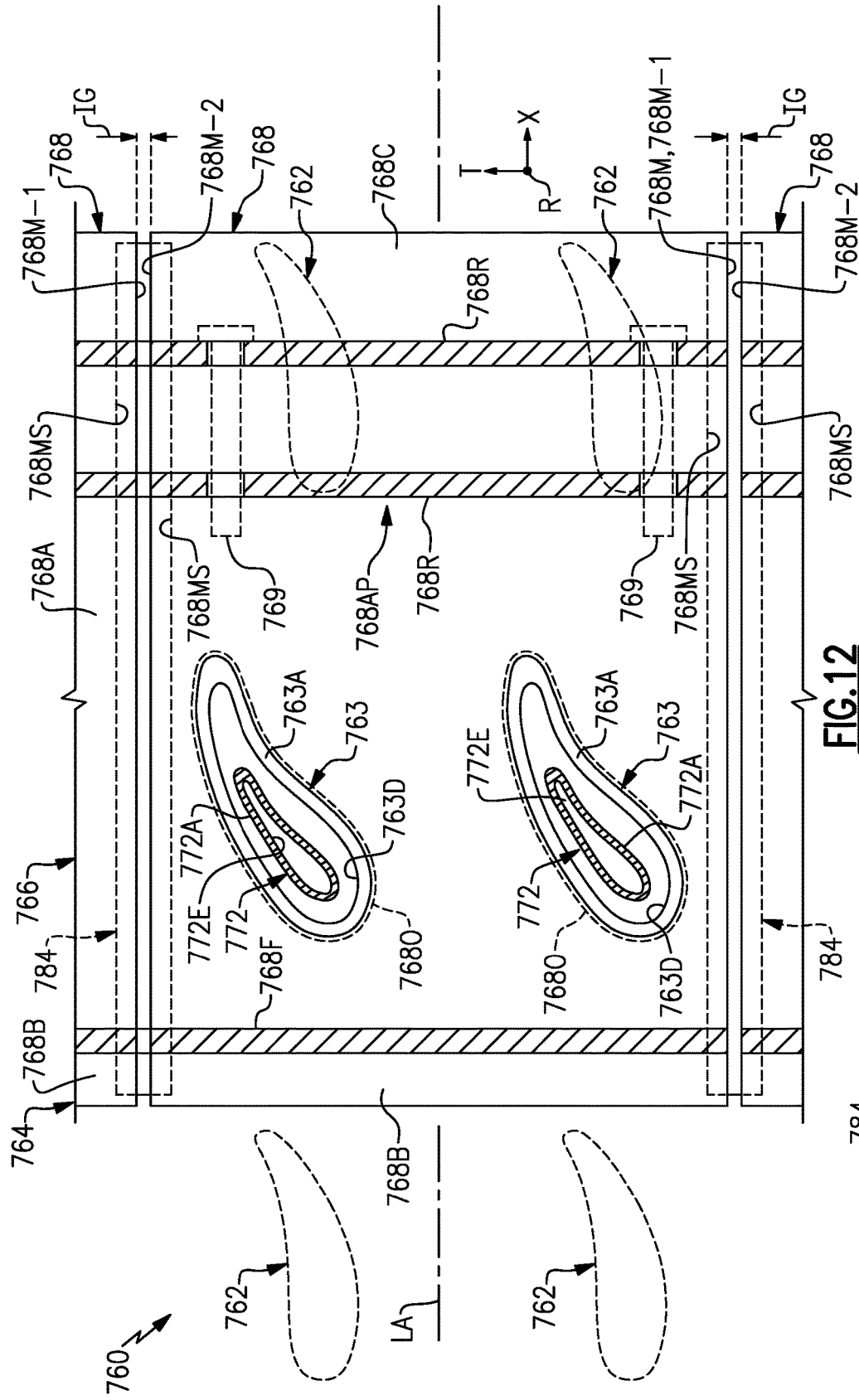

FLOWPATH ASSEMBLY FOR GAS TURBINE ENGINE

BACKGROUND

This disclosure relates to gas turbine engines, and more particularly to techniques for bounding a flowpath through the engine.

Gas turbine engines typically include a compressor and a turbine. The air is compressed in the compressor. From the compressor the air is introduced into a combustor where it is mixed with fuel and ignited. Products of this combustion pass downstream through a gas path in the turbine. The turbine may include turbine blades that extract energy from the combustion products in the gas path for driving the compressor. An end wall may be utilized to bound the gas path.

SUMMARY

An assembly for a gas turbine engine according to an example of the present disclosure includes an end wall having a main body extending between a first end portion and a second end portion to establish a seal face. The seal face is dimensioned to establish a clearance gap with a rotatable blade along a gas path, and the end wall includes a first attachment portion dimensioned to fixedly attach the main body to a static structure at a first attachment point. An airfoil extends radially inwardly from the end wall relative to an assembly axis. The airfoil includes an inner cavity extending between a first end portion and a second end portion. The first end portion is adjacent the end wall of the airfoil. A spar member includes a spar body extending between a first end portion and a second end portion. The spar body extends at least partially through the inner cavity. The first end portion of the spar member is attachable to the static structure at a second attachment point axially between the first end portion of the end wall and the first attachment portion such that the first end portion of the end wall is cantilevered from the first attachment point.

In a further embodiment of any of the foregoing embodiments, the airfoil includes a fairing integrally formed with the end wall, and both the fairing and the end wall comprise a ceramic matrix composite (CMC) material.

A further embodiment of any of the foregoing embodiments includes a spring member dimensioned to bias the first end portion of the endwall radially outwardly relative to the assembly axis.

In a further embodiment of any of the foregoing embodiments, the static structure includes a case dimensioned to extend circumferentially about the end wall relative to the assembly axis. The end wall is attachable to the case at the first attachment point. The first end portion of the spar member is attachable to the case at the second attachment point, and the second attachment point is axially spaced apart from the first attachment point relative to the assembly axis.

In a further embodiment of any of the foregoing embodiments, the end wall includes a flange that extends radially outwardly from the first end portion of the end wall relative to the assembly axis, and the flange is dimensioned to establish a spline interface with the first end portion of the spar member.

In a further embodiment of any of the foregoing embodiments, the airfoil includes a fairing. The fairing includes an airfoil section extending from a platform section, and the platform section radially opposes the end wall with respect to assembly axis.

In a further embodiment of any of the foregoing embodiments, the end wall includes a circumferential face dimensioned to at least partially surround an outer periphery of the airfoil section.

In a further embodiment of any of the foregoing embodiments, the fairing is integrally formed with the end wall.

In a further embodiment of any of the foregoing embodiments, the spar member includes an inner cavity dimensioned to convey cooling flow from a coolant source to a plenum radially inwardly of the platform section relative to the assembly axis.

In a further embodiment of any of the foregoing embodiments, the airfoil section is moveable relative to the spar member.

A further embodiment of any of the foregoing embodiments includes a spring member dimensioned to bias the first end portion of the endwall radially outwardly relative to the assembly axis.

A further embodiment of any of the foregoing embodiments includes a spring plate and a seal member captured between the spring plate and the end wall to establish a sealing relationship with an outer periphery of the airfoil section.

In a further embodiment of any of the foregoing embodiments, the airfoil is a turbine vane, and the rotatable blade is a turbine blade.

A gas turbine engine according to an example of the present disclosure includes a section having an array of blades rotatable about a longitudinal axis, and an end wall including an array of arc segments arranged circumferentially about the array of blades relative to the longitudinal axis. Each of the arc segments include a main body extending between a first end portion and a second end portion to establish a seal face that bounds a gas path. The seal face is dimensioned to establish a clearance gap with the blades, and each of the arc segment includes a first attachment portion fixedly attached to a static structure at a first attachment point such that the first end portion of the arc segment is cantilevered from the first attachment point. An array of vanes adjacent to the array of blades extend inwardly from the seal face of a respective one of the arc segments and at least partially across the gas path. An array of spar members is fixedly attached to the static structure. Each of the spar members extends at least partially through an inner cavity of a respective one of the vanes.

In a further embodiment of any of the foregoing embodiments, each of the arc segments comprises a ceramic material.

In a further embodiment of any of the foregoing embodiments, the arc segments are moveable in a radial direction relative to the spar members with respect to the longitudinal axis.

In a further embodiment of any of the foregoing embodiments, each of the spar members includes an inner cavity dimensioned to convey cooling flow from a coolant source to a plenum radially inward of the respective vane relative to the longitudinal axis.

In a further embodiment of any of the foregoing embodiments, each of the vanes includes an airfoil section and a platform section that bounds the gas path, the airfoil section extending radially between the platform section and the respective arc segment relative to the longitudinal axis.

In a further embodiment of any of the foregoing embodiments, the airfoil section is integrally formed with the main body of a respective one of the arc segments.

A further embodiment of any of the foregoing embodiments includes at least one spring member dimensioned to bias a first end portion of the respective one of the arc segments radially outwardly relative to the longitudinal axis. The at least one spring member is dimensioned to provide a radial reaction force that is between approximately 70 percent and approximately 95 percent of a peak total radial aerodynamic load acting on the respective one of the arc segments and a respective one of the vanes axially forward of the first attachment portion relative to the longitudinal axis in operation.

A further embodiment of any of the foregoing embodiments includes a plurality of seal members dimensioned to establish a sealing relationship with an outer periphery of a respective one of the airfoil sections. Each of the arc segments extends in a circumferential direction between a first mate face and a second mate face. The first mate face is dimensioned to establish an intersegment gap with the second mate face of an adjacent one of the arc segments, and the first and second mate faces includes respective slots dimensioned to receive a respective one of the seal members such that the seal member spans across the intersegment gap.

In a further embodiment of any of the foregoing embodiments, each of the arc segments includes a plurality of openings, and each of the openings is dimensioned to at least partially receive a spar body of a respective one of the spar members and the airfoil section of a respective one of the vanes such that the arc segment is radially aligned with at least two of the spar members and at least two of the vanes relative to the longitudinal axis.

The present disclosure may include any one or more of the individual features disclosed above and/or below alone or in any combination thereof.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 8 illustrates an exemplary sealing arrangement.

FIG. 9 illustrates another exemplary sealing arrangement.

FIG. 12 illustrates a plan view of an exemplary section of a gas turbine engine including a flowpath assembly.

FIG. 13 illustrates a seal member that may be incorporated into the flowpath assembly of FIG. 12.

Like reference numbers and designations in the various drawings indicate like elements.

DETAILED DESCRIPTION

Figure 1:
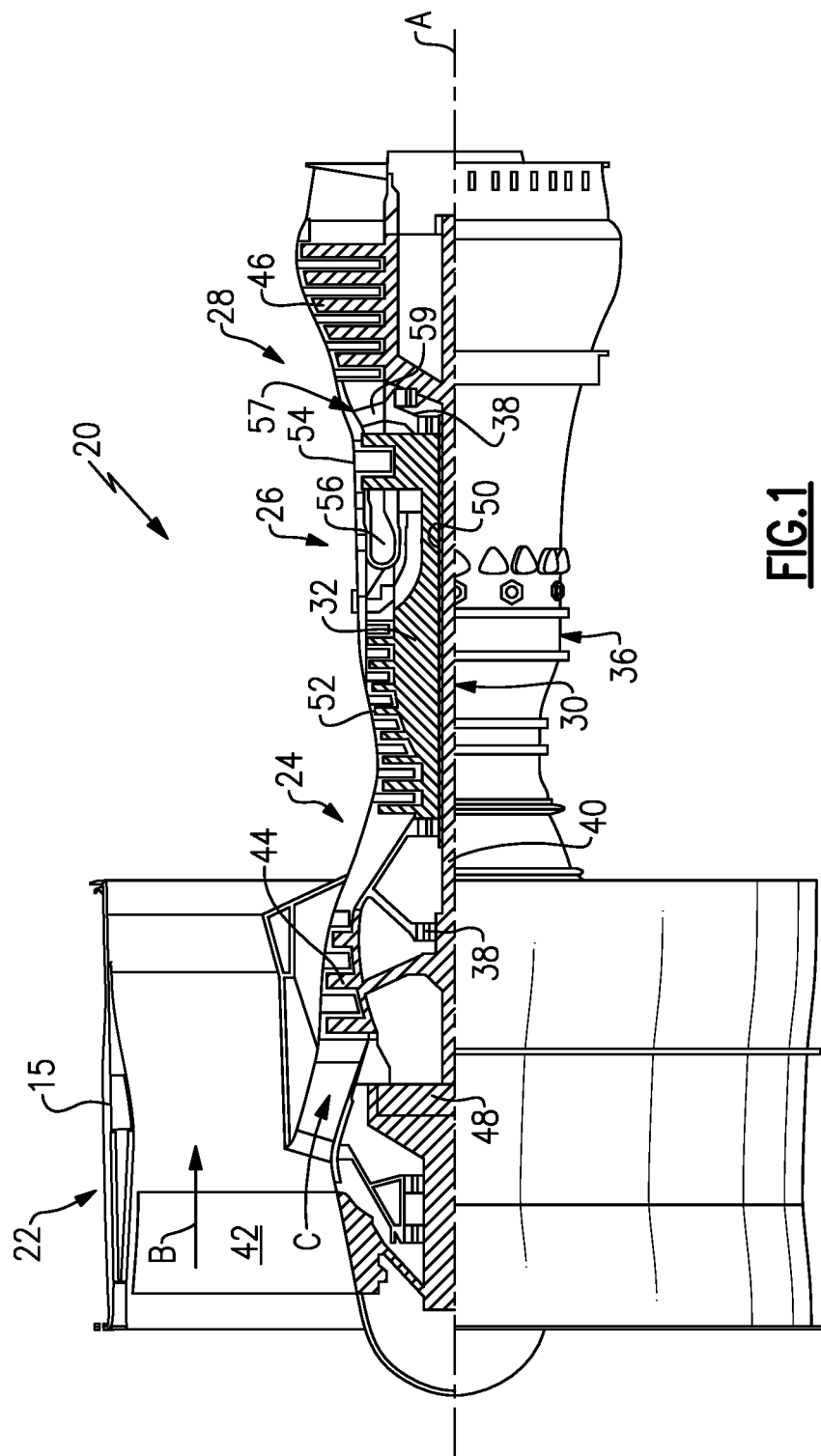
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
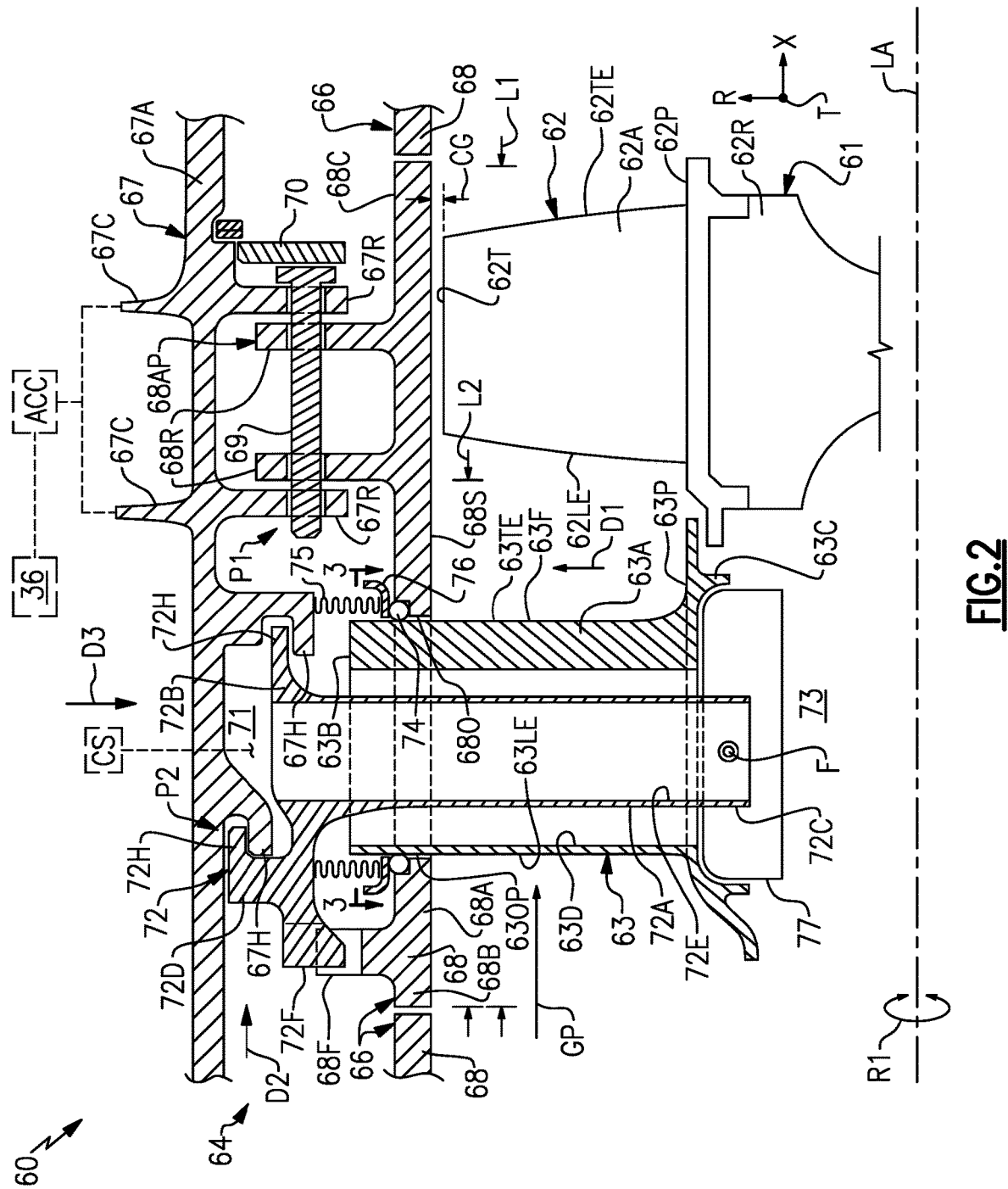
FIG. 2 illustrates a section of a gas turbine engine including a flowpath assembly.

FIG. 2 illustrates an exemplary section 60 for a gas turbine engine. The section 60 may be incorporated into the gas turbine engine 20 of FIG. 1, such as the compressor section 24 or turbine section 28. Other portions of the gas turbine engine 20 and other systems may benefit from the teachings disclosed herein, including gas turbine engines lacking a fan for propulsion.

The section 60 can include a rotor 61 carrying one or more rotatable airfoils or blades 62. The blades 62 are rotatable about a longitudinal (or assembly) axis LA. The longitudinal axis LA can be collinear with or otherwise parallel to the engine axis A of FIG. 1.

Each blade 62 can include a platform section 62P and an airfoil section 62A extending in a radial direction R from the platform section 62P to a tip 62T. The airfoil section 62A generally extends in a chordwise or axial direction X between a leading edge 62LE and a trailing edge 62TE. A root section 62R of the airfoil 62 can be mounted to, or can be integrally formed with, the rotor 61.

The section 60 can include an airfoil or static vane 63 situated adjacent the blade 62. The vane 63 can be a turbine vane and the rotatable blade 62 can be a turbine blade incorporated into the turbine section 28, for example. Each vane 63 can include an airfoil section 63A and a platform section 63P. The airfoil section 63A can extend radially between a first end portion 63B and a second end portion 63C. The airfoil section 63A can be dimensioned to extend in the radial direction R from the platform section 63P. The airfoil section 63A generally extends in the chordwise direction X between a leading edge 63LE and trailing edge 63TE.

The section 60 can include a flow path (or endwall) assembly 64. The assembly 64 can be arranged to bound and establish sealing relationships along flowpaths, with non-rotating or static components such as static vanes, and/or rotating components including rotatable airfoils and bladed disks, for example. The turbine section and other portions of the engine can benefit from the teachings disclosed herein, including the compressor section, combustor section, mid-turbine frame and exhaust nozzle.

The assembly 64 can include one or more end walls 66 that extend in a circumferential or thickness direction T at least partially or completely about the longitudinal axis LA to bound a gas path GP. The gas path GP may be a portion of the core flow path C of FIG. 1, for example. The end wall 66 may be coupled to, or integrally formed with, one or more of the vanes 63.

Figure 4:
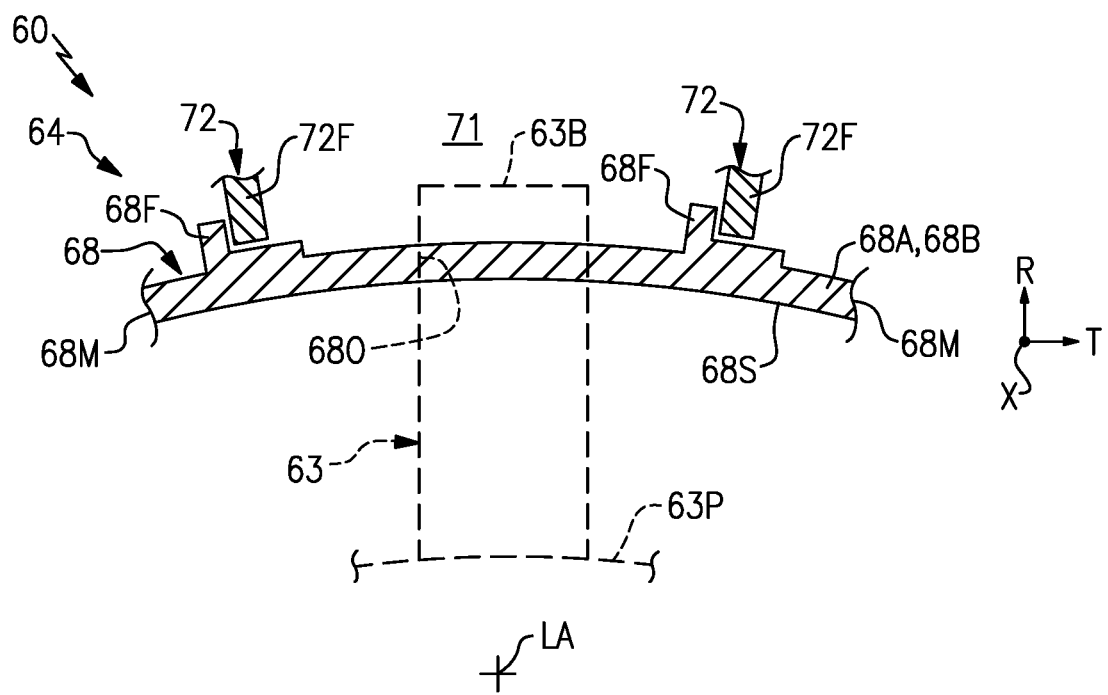
FIG. 4 illustrates an indexing feature of the flowpath assembly of FIG. 2.

The end wall 66 may include one or more arc segments 68. Each arc segment 68 may include a main body 68A that extends between a first end (e.g., leading edge) portion 68B and a second end (e.g., trailing edge) portion 68C to establish a seal face 68S dimensioned to bound the gas path GP. The seal face 68S can have a substantially arcuate geometry, as illustrated in FIG. 4, or another geometry such as a generally planar profile.

Each arc segment 68 can be spaced radially outwardly from the tip 62T of the adjacent blades 62 to serve as a blade outer air seal (BOAS). The seal face 68S can be dimensioned to establish a clearance gap CG with the tip 62T of each of the blades 62 along the gas path GP. The tip 62T of each blade 62 and each adjacent arc segment 68 can be arranged in close proximity to reduce the amount of gas flow that is redirected toward and over the tip 62T through the corresponding clearance gap CG during engine operation.

The airfoil section 63A of the vane 63 may extend radially between the platform section 63P and the respective arc segment 68 relative to the longitudinal axis LA. For example, at least the airfoil section 63A of each of the vanes 63 may be dimensioned to extend radially inwardly from the seal face 68S of the respective arc segment 68 relative to the longitudinal axis LA such that the airfoil section 63A extends at least partially or completely across the gas path GP to the platform section 63P.

The arc segments 68 may be arranged to radially oppose the platform section 62P of the blades 62 and/or the platform section 63P of the vanes 63 to bound the gas path GP. For example, the arc segments 68 may be arranged to bound an outer periphery of the gas path GP, and the platform section 63P of the vane 63 may bound an inner periphery of the gas path GP such that the platform section 63P radially opposes the seal face 68S of the arc segment 68.

The section 60 can include an array of blades 62, an array of vanes 63, and an array of arc segments 68 arranged circumferentially about the longitudinal axis LA. The array of vanes 63 can be situated adjacent to the array of blades 62. The array of arc segments 68 can be arranged circumferentially about the array of blades 62 and array of vanes 63 relative to the longitudinal axis LA. The arc segments 68 can be circumferentially distributed in an annulus about the array of the blades 62 and array of vanes 63 to bound the gas path GP.

Various techniques may be utilized to position the vanes 63 relative to the end wall 66. The first end portion 63B of the vane 63 may be positioned adjacent to the respective arc segment 68 of the end wall 66. The arc segment 68 can include one or more openings 680 in the main body 68A. The opening 680 can be dimensioned to at least partially receive the airfoil section 63A of a respective vane 63. For example, the airfoil section 63A of the vane 63 may be moved in a direction D1 through the opening 680 such that the first end portion 63B of the vane 63 is situated radially outward of the seal face 68S of the arc segment 68. The direction D1 may be substantially parallel to the radial direction R. The opening 680 may be dimensioned to substantially complement a geometry of an outer periphery 630P of the airfoil section 63A of the vane 63 (see also FIG. 3). For the purposes of this disclosure, the terms "substantially" and "approximately" mean±5 percent of the stated value or relationship unless otherwise indicated.

Various techniques may be utilized to secure the arc segments 68 of the end wall 66 to a static structure. The static structure may be a portion of the gas turbine engine 20 of FIG. 1, such as the engine static structure 36. The section 60 may include an annular housing or case 67 dimensioned to extend about the longitudinal axis LA. The case 67 may form a portion of the static structure 36. The case 67 may be a turbine case in the turbine section 28, or may be a separate case at least partially surrounded by the turbine case, for example. The case 67 may be dimensioned to extend circumferentially about the arc segments 68 of the end wall 66 relative to the longitudinal axis LA.

The arc segments 68 may be fixedly attached or otherwise secured to the case 67 or static structure 36 at a respective first attachment point P1. Each of the arc segments 68 may include at least one or more first attachment portions 68AP for securing the end wall 66. The first attachment portion 68AP may be dimensioned to fixedly attach or otherwise secure the main body 68A of the arc segment 68 to the static structure at the first attachment point P1. The first attachment portion 68AP may be dimensioned to fixedly attach the arc segment 68 to the case 67.

The first attachment portion 68AP of the arc segment 68 can include one or more rails 68R. Each rail 68R can extend radially outwardly from the main body 68A of the arc segment 68. The case 67 may include one or more mounting rails 67R that extend radially inwardly from the main body 67A of the case 67. The mounting rails 67R can be dimensioned to cooperate with the rails 68R of the arc segment 68 to secure the arc segment 68 to the case 67. One or more fasteners 69 can be positioned in a set of bores in the rails 67R and 68R to secure the arc segment 68 to the case 67. A retaining plate 70 may be positioned to trap or otherwise secure the fastener 69 in the installed position.

The first attachment portion 68AP of each of the arc segments 68 can be fixedly attached or otherwise secured to the case 67 or static structure 36 at the first attachment point P1 such that the first end portion 68B of the arc segment 68 is cantilevered from the first attachment point P1, as illustrated in FIG. 2. Each portion of the main body 68A of the arc segment 68 axially forward of the first attachment portion 68AP relative to the longitudinal axis LA can be cantilevered from the first attachment point P1.

Cantilevering the arc segment 68 at the first attachment point P1 can be established at a predetermined position relative to a dimension of the arc segment 68. The arc segment 68 can extend axially between terminal ends of the first and second end portions 68B, 68C to establish a first length L1 relative to the longitudinal axis LA. The first attachment point P1 can be established at a second length L2 from the terminal end of the first end portion 68B relative to the longitudinal axis LA. The first and second lengths L1, L2 can be established with respect to an axial position along the seal face 68S of the arc segment 68. The length L2 can be established at an axially forwardmost portion of the first attachment point P1 in which the main body 68A of the arc segment 68 is cantilevered. A ratio of L2:L1 can be less than or equal to 0.9, or more narrowly less than or equal to 0.7. The ratio of L2:L1 can be greater than or equal to 0.5.

Various techniques may be utilized to construct each of the vanes 63. Each of the vanes 63 can include a fairing 63F that establishes the airfoil section 63A and platform section 63P. Surfaces of the fairing 63F can establish an aerodynamic contour of the airfoil section 63A and a gas path surface of the platform section 63P. The fairing 63F can be constructed such that the airfoil section 63A is integrally formed with the platform section 63P.

Figure 3:
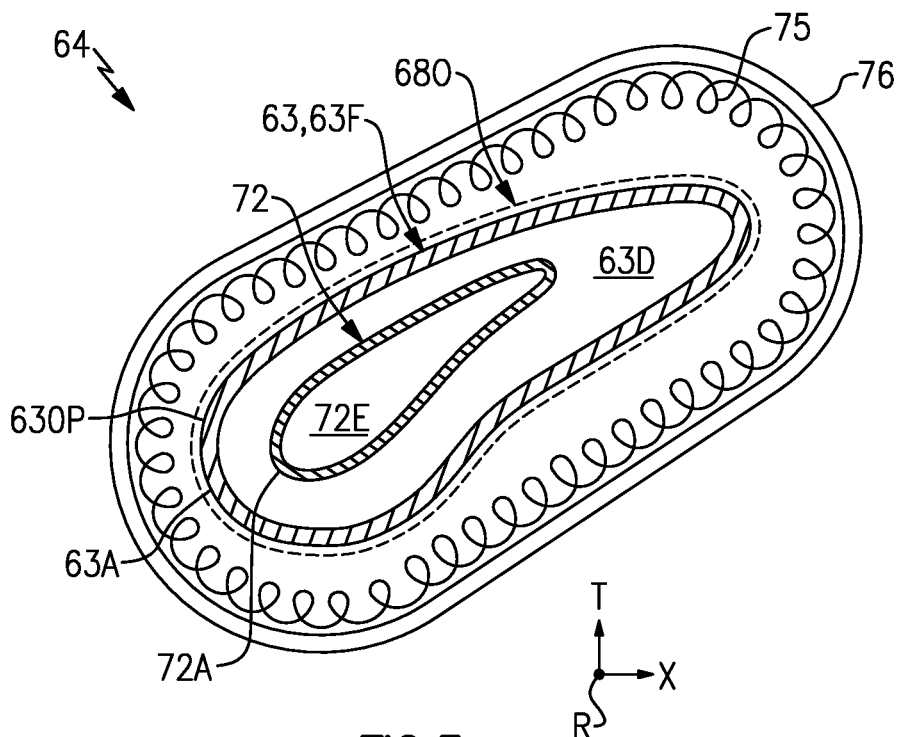
FIG. 3 illustrates a portion of the flowpath assembly taken along line 3-3 of FIG. 2.

The fairing 63F can include an inner cavity 63D (see also FIG. 3). The inner cavity 63D can be dimensioned to extend radially between the first end portion 63B and the second end portion 63C of the respective vane 63.

The case 67 may experience thermal growth due to relatively hot gases communicated in the adjacent gas path GP. The case 67 can be coupled to an active clearance control (ACC) system (shown in dashed lines for illustrative purposes) for positioning the case 67 relative to the longitudinal axis LA and/or static structure 36 during engine operation. The case 67 may include one or more control rails 67C that extend radially outwardly from a main body 67A of the case 67. The ACC system can be coupled to the control rails 67C. The ACC system can be operable to move the case 67 in the radial direction R during engine operation to vary and/or maintain a predetermined dimension of the clearance gap CG between each of the seal faces 68S and the tips 62T of the blades 62. One would understand how to configure the system ACC with logic to vary a position of the case 67 in accordance with the teachings disclosed herein. In other implementations, the case 67 forms a portion of the static structure 36 or is arranged at a fixed position relative to the static structure 36.

The assembly 64 can include an array of spar members 72 secured or positioned in respective fairings 63F of the vanes 63. The spar members 72 can be fixedly attached or otherwise secured to the case 67 or static structure 36. Each of the spar members 72 can include a spar (or main) body 72A extending radially between a first end portion 72B and second end portion 72C. The spar body 72A can be dimensioned to extend at least partially through the inner cavity 63D of the respective vane 63, as illustrated in FIGS. 2-3. A respective opening 680 of the arc segment 68 can be dimensioned to at least partially receive the spar body 72A of a respective spar member 72. For example, the spar member 72 can be movable in a direction D3 such that each opening 680 at least partially receives the spar body 72A of a respective spar member 72. The direction D3 can be substantially parallel to a radial direction R, and can be substantially opposed to direction D1. The spar member 72 can be situated relative to the opening 680 prior or subsequent to positioning the respective airfoil section 63A of the vane 63 in the opening 680. The arc segment 68 can be moved together with the respective vane(s) 63 and spar member(s) 72 as a unit to situate the unit in a predetermined position relative to the static structure 36.

Various techniques can be utilized to secure the spar members 72 to the static structure 36. The first end portion 72B of the spar member 72 can be attachable to the case 67 or another portion of the static structure 36 at a second attachment point P2. Each spar member 72 can include a second attachment portion 72D extending outwardly from the first end portion 72B of the spar member 72. The second attachment portion 72D can be dimensioned to cooperate with the case 67 or another portion of the static structure 36 to establish the second attachment point P2. The second attachment portion 72D can include one or more hooks 72H dimensioned to cooperate with one or more respective hooks 67H of the case 67.

The second attachment point P2 can be axially spaced apart from the first attachment point P1 relative to the assembly axis LA. The second attachment portion 72D can be established at the first end portion 72B of the spar member 72 such that the second attachment point P2 is axially between a terminal end (e.g., leading edge) of the first end portion 68B and the first attachment portion 68AP of the arc segment 68 such that the first end portion 68B of the arc segment 68 of the end wall 66 is cantilevered from the first attachment point P1, as illustrated in FIG. 2.

The spar members 72 can be non-structural components or can be structural components dimensioned to support the respective fairings 63F and/or a portion of the section 60 radially inward of the vane 63 to establish a load path with the case 67 or static structure 36. The second end portion 72C of the spar member 72 can be fixedly attached or otherwise secured to an annular housing 77 with one or more fasteners F. The housing 77 can be a full circumferential hoop or can include one or more segments fastened to the respective spar members 72. The housing 77 can be dimensioned to abut the fairing 63F to limit movement of fairing 63F relative to the longitudinal axis LA. The housing 77 can be utilized to interconnect the array of spar members 72. The housing 77 can be dimensioned to support one or more of the bearing systems 38 (FIG. 1). In other examples, the spar member 72 can be cantilevered from the case 67.

The main body 72A of each spar member 72 can be an elongated hollow strut or conduit dimensioned to convey fluid such as coolant or lubricant to an adjacent portion of the section 60. Each spar member 72 can include an inner cavity 72E dimensioned to convey the fluid. The inner cavity 72E can be dimensioned to extend radially through a thickness of the main body 72A between the first end portion 72B and second end portion 72C of the spar member 72.

The inner cavity 72E of the spar member 72 can be dimensioned to interconnect a first plenum 71 and a second plenum 73. The first plenum 71 can be radially outward of the gas path GP, and the second plenum 73 can be radially inward of the gas path GP, as illustrated in FIG. 2. The first and second plenums 71, 73 can extend generally in the circumferential direction T. The first plenum 71 can be bounded between surfaces of the case 67 and end wall 66. The second plenum 73 can be radially inward of, and can be bounded by, a radially inner (e.g., cold side) surface of the platform section 63P.

The first plenum 71 and/or inner cavity 72E can be coupled to a coolant source CS (shown in dashed lines in FIG. 2 for illustrative purposes). The coolant source CS can be configured to supply or convey pressurized cooling flow to cool portions of the section 60 including the case 67 and each vane 63. The coolant source CS can include bleed air from an upstream stage of the compressor section 24 (FIG. 1), bypass air, or a secondary cooling system aboard the aircraft, for example. The inner cavity 72E of the spar member 72 can be dimensioned to convey fluid from the coolant source CS, either directly or from the first plenum 71, to the second plenum 73. The second plenum 73 can be dimensioned to convey fluid from the inner cavity 72E to a seal arrangement adjacent the gas path GP and/or a bearing compartment of one of the bearing systems 38 (FIG. 1), for example.

The spar member 72 may be positioned in the arc segment 68 and vane 63, which may be rotated as a unit in a rotational direction R1 about the longitudinal axis LA to clock or otherwise mount each hook 72H to the respective hook 67H. Thereafter, the spar member 72 may be fixedly attached or otherwise secured to the housing 77 with the fastener(s) F, and each fastener 69 can be positioned to fixedly attach or otherwise secure the rails 68R to the rails 67R. In other examples, the spar member 72 can be moved in a direction D2 to mount the hooks 72H to the hooks 67H of the case 67. The direction D2 can be substantially parallel to the longitudinal axis LA.

Referring to FIGS. 2 and 4, the assembly 64 can include an indexing feature to limit relative circumferential movement between the arc segments 68 and spar members 72 with respect to the longitudinal axis LA. Each arc segment 68 can include one or more flanges 68F. Each flange 68F can be dimensioned to extend radially outward from the first end portion 68B of the arc segment 68 relative to the assembly axis LA. Each spar member 72 can include one or more flanges 72F. Each flange 72F can extend from the first end portion 72B of the spar member 72. Each flange 68F may be dimensioned to establish a spline interface with a respective one of the flanges 72F to limit relative circumferential movement between the arc segment 68 and the respective spar member 72. Limiting circumferential movement may reduce leakage of cooling flow through intersegment gaps established by mate faces 68M (FIG. 4) of adjacent arc segments 68 (see also FIGS. 12 and 14).

Various materials may be incorporated into the assembly 64 to establish the vanes 63, arc segments 68 of the end wall 66, and spar members 72, including metallic and/or non-metallic materials. The spar members 72 may be formed of a metallic material, such as a high temperature metal or superalloy or a metal matrix composite. Each of the arc segments 68 and fairing 63F can comprise a ceramic material, such as a monolithic ceramic or a ceramic matrix composite (CMC) material. A CMC material can be utilized to establish the airfoil section 63A and/or platform section 63P of the vane 63. The CMC materials disclosed herein can include continuous or discontinuous fibers in a matrix arranged in one or more layers to establish a CMC layup. In other examples, the vanes 63 are made of a metallic material, including any of the materials disclosed herein.

Figure 5:
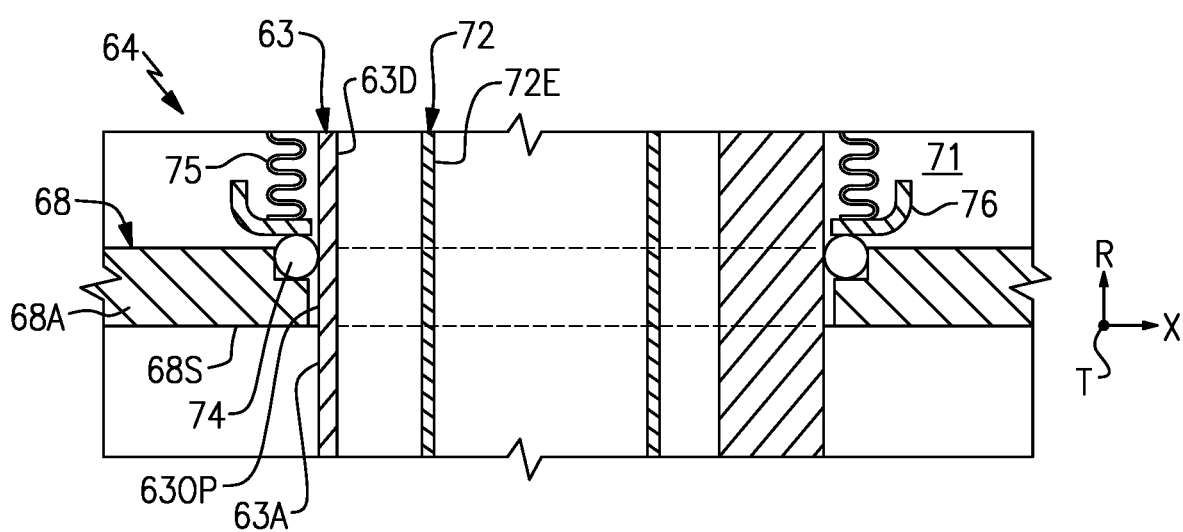
FIG. 5 illustrates a sealing arrangement of the flowpath assembly of FIG. 2.

Various techniques can be utilized to establish a sealing relationship between the arc segment 68 and the outer periphery 630P of the vane 63 to limit fluid flow between the first plenum 71 and the gas path GP, which can reduce cooling flow demands and improve efficiency. Referring to FIG. 5, with continuing reference to FIGS. 2-3, the assembly 64 can include one or more seal members 74, one or more spring members 75, and one or more spring plates 76. The seal member 74 can be a rope seal, for example, and can be made of any of the materials disclosed herein, including a ceramic fiber material available under the trade name NEXTEL™ and metallic sheathed NEXTEL™. The seal member 74 can be captured between the spring plate 76 and the main body 68A of the arc segment 68 to establish a sealing relationship with the outer periphery 630P of the airfoil section 63A. The spring plate 76 can have a generally L-shaped cross-sectional geometry including a circumferential lip to capture an end portion of the spring member 75. The seal member 74, spring plate 76 and/or spring member 75 can be dimensioned to extend at least partially or completely about the outer periphery 630P of the vane 63, as illustrated in FIG. 3.

The airfoil section 63A of the vane 63 and spar member 72 may be movable relative to each other during engine operation. The arc segment 68 and/or vane 63 may be movable in the radial direction R relative to the spar member 72 with respect to the longitudinal axis LA, which may occur due to thermal growth of the case 67 and/or movement of the case 67 in response to actuation of the system ACC (FIG. 2). The spring member 75 can be dimensioned to bias or seat the spring plate 76 and seal member 74 against the main body 68A of the arc segment 68 to establish and maintain the sealing relationship.

Figure 6:
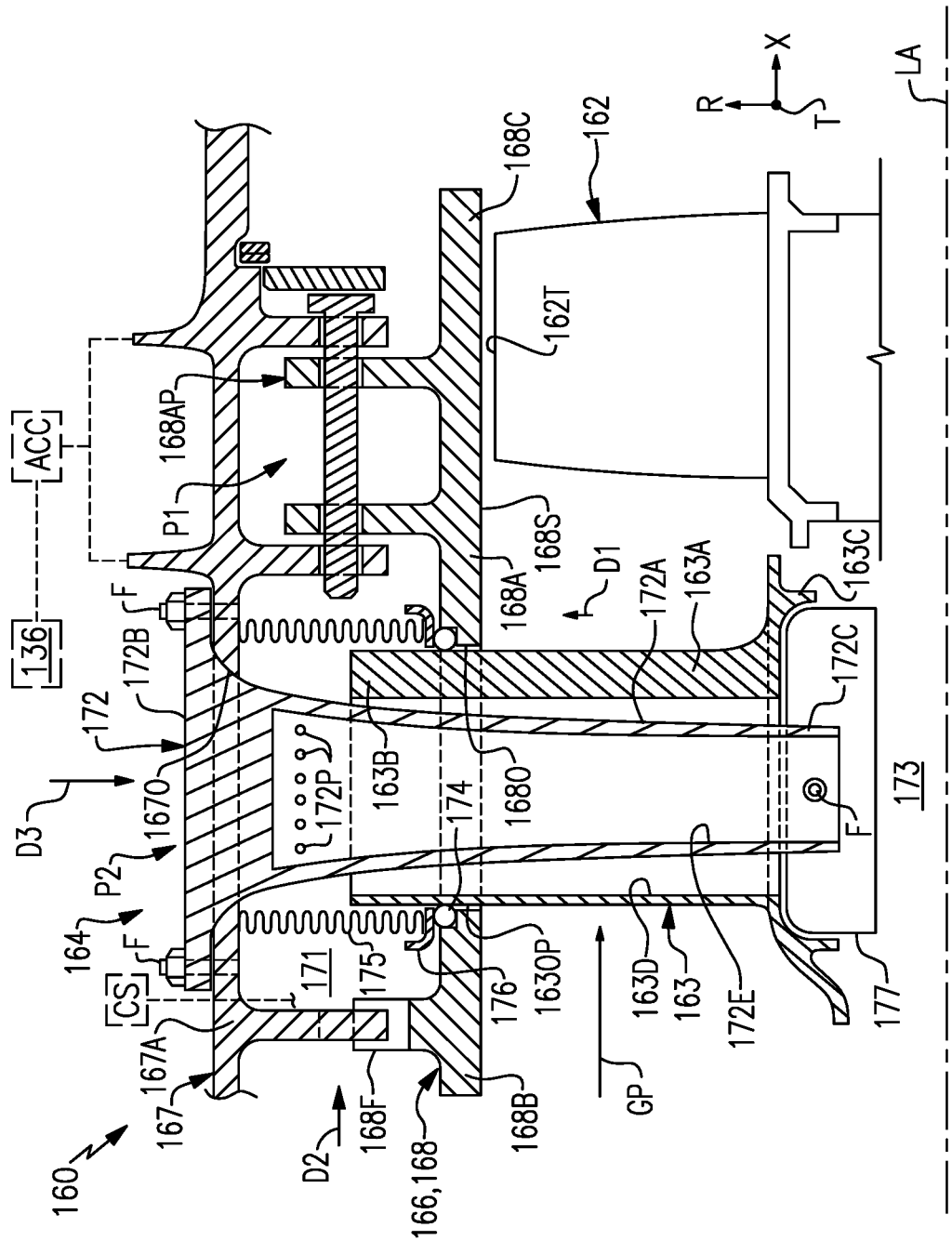
FIG. 6 illustrates another exemplary section of a gas turbine engine including a flowpath assembly.

FIG. 6 illustrates an exemplary section 160 including a flowpath assembly 164 for a gas turbine engine. In this disclosure, like reference numerals designate like elements where appropriate and reference numerals with the addition of one-hundred or multiples thereof designate modified elements that are understood to incorporate the same features and benefits of the corresponding original elements.

The assembly 164 can include an end wall 166 including an array of arc segments 168, an array of vanes 163 and an array of spar members 172. A first end portion 172B of each spar member 172 can be fixedly attached or otherwise secured to case 167 with one or more fasteners F at a second attachment point P2. A main body 172A of the spar member 172 can be moveable in the direction D3 at least partially through a respective opening 1670 in the case 167 towards the longitudinal axis LA such that a second end portion 172C of the spar member 172 is at least partially received in and/or extends through a cavity 163D of the vane 163.

The assembly 164 can include an indexing feature to limit relative circumferential movement between the respective arc segment 168 and case 167 with respect to the longitudinal axis LA. Each arc segment 168 can include one or more flanges 168F. The flange 168F can extend radially outward from a main body 168A of the arc segment 168. The case 167 can include one or more flanges 167F. The flange 167F can extend radially inward from a main body 167A of the case 167. Each flange 168F can be dimensioned to establish a spline interface with a respective one of the flanges 167F to limit relative circumferential movement between the arc segment 168 and the case 167.

The assembly 164 can include one or more seal members 174, one or more spring members 175, and one or more spring plates 176. The seal member 174 can be captured between the spring plate 176 and the main body 168A of the arc segment 168 to establish a sealing relationship with an outer periphery 1630P of the airfoil section 163A of the respective vane 163. The spring member 175 can extend between the main body 167A of the case 167 and the spring plate 176 to bias or seat the spring plate 176 and seal member 174 against the main body 168A of the arc segment 168.

The spar member 172 can include one or more passages 172P extending through a thickness of the main body 172A to interconnect a first plenum 171 and an inner cavity 172E of the spar member 172. The passages 172P can serve as inlet holes and can be dimensioned to convey fluid such as cooling flow from a coolant source CS to the inner cavity 172E. The inner cavity 172E can be dimensioned to convey the fluid to a second plenum 173.

Figure 7:
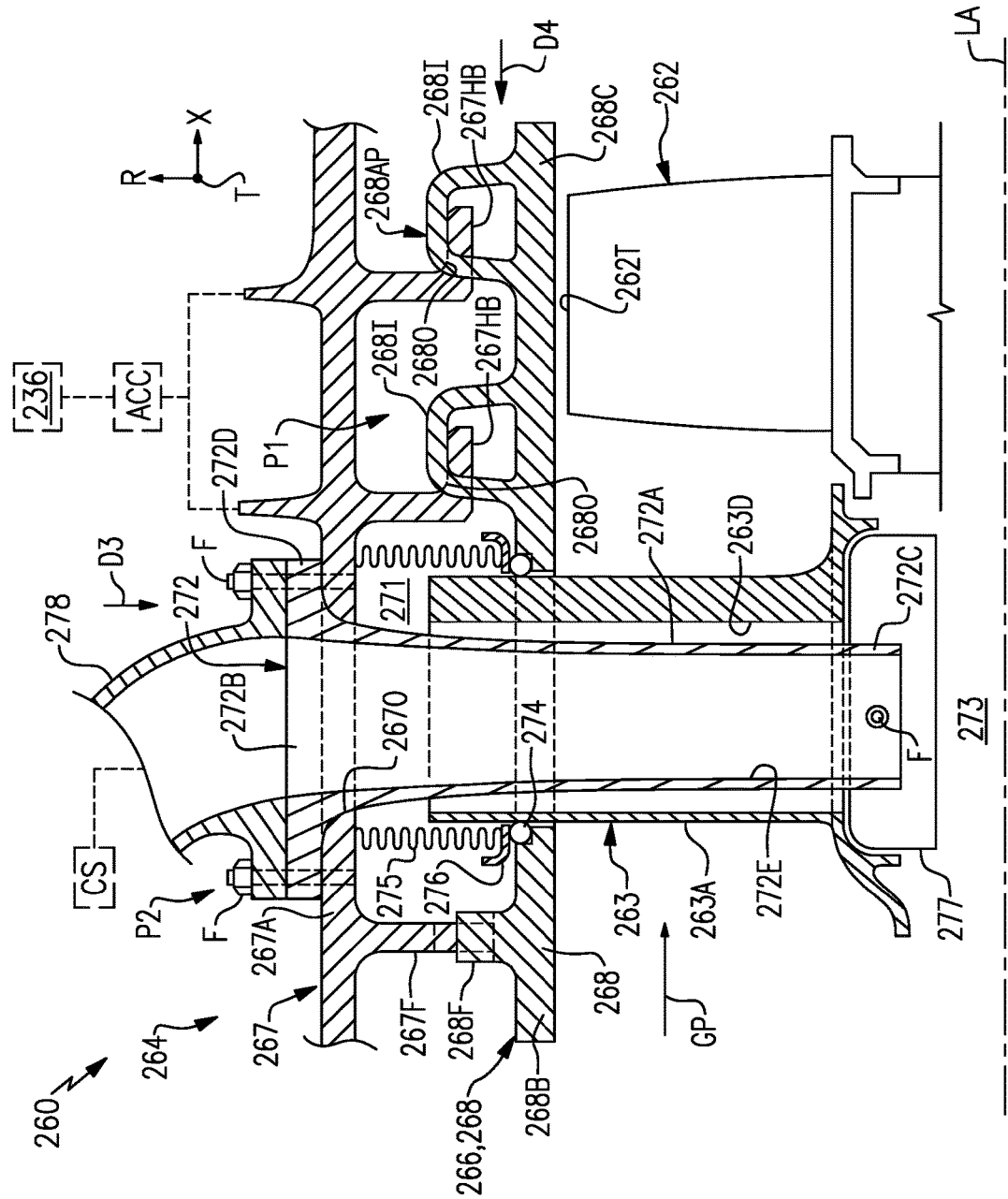
FIG. 7 illustrates another exemplary section of a gas turbine engine including a flowpath assembly.

FIG. 7 illustrates an exemplary section 260 including a flowpath assembly 264 for a gas turbine engine. The assembly 264 can include an end wall 266 including an array of arc segments 268, an array of vanes 263 and an array of spar members 272. A main body 272A of the spar member 272 can be moveable in a direction D3 at least partially through a respective opening 2670 in a case 267 towards the longitudinal axis LA such that a second end portion 272C of the spar member 272 is at least partially received in and/or extends through a cavity 263D of the vane 263.

The spar member 272 can include a second attachment portion 272D dimensioned to mechanically attach or otherwise secure the spar member 272 to the case 267. The second attachment portion 272D can be a flange established along a first end portion 272B of the spar member 272. The second attachment portion 272D can be fixedly attached or otherwise secured to the case 267 with one or more fasteners F at the second attachment point P2.

The second attachment portion 272D of the spar member 272 can be mechanically attached or otherwise secured to a respective conduit (e.g., cooling pipe) 278 with one or more of the fasteners F. The conduit 278 can be fluidly coupled to a coolant source CS. The conduit 278 can be dimensioned to convey fluid from the coolant source CS to an inner cavity 272E of the spar member 272.

Each arc segment 268 can include a first attachment portion 268AP dimensioned to be fixedly attached or otherwise secured to the case 267 or static structure 236 at a first attachment point P1. The first attachment portion 268AP can include one or more interface members 2681. Each interface member 2681 can be dimensioned in the shape of an elongated hollow box extending in a circumferential or thickness direction T. The first attachment portion 268AP can include one or more recesses or openings 2680. The openings 2680 can be established in the interface members 2681. The case 267 can include one or more hooks 267HB extending inwardly from the main body 267A of the case 267. Each opening 2680 can be dimensioned to at least partially receive a respective hook 267HB to secure the arc segment 268 to the case 267. The arc segment 268 can be moved in a direction D4 to mount the hooks 267HB in the openings 2680. The direction D4 can be substantially parallel to the longitudinal axis LA.

FIG. 8 illustrates an exemplary flowpath assembly 364 for a gas turbine engine. The flowpath assembly 364 can be incorporated into any of the flowpath assemblies and sections disclosed herein. The assembly 364 can include a seal member 374, spring member 375, and spring plate 376. The seal member 374 can be captured between the spring plate 376 and a main body 368A of the arc segment 368 to establish a sealing relationship with an outer periphery 3630P of an airfoil section 363A of a respective vane 363.

The seal member 374 can be a wedge seal having a sloped face 374SF dimensioned to interface with a sloped face 368SF along the main body 368A of the arc segment 368 to establish a sealing relationship. The seal member 374 can have a unitary construction or can include one or more segments joined together. Various materials can be utilized to form the seal member 374, such as a ceramic matrix composite material, a nickel or cobalt based superalloy material, or a Nextel material with a superalloy jacket. The spring member 375 is dimensioned to seat or bias the sloped face 374SF of the seal member 374 against the sloped face 368SF of the arc segment 368 such that the seal member 374 is urged against the outer periphery 363OP of the vane 363 to establish a sealing relationship.

FIG. 9 illustrates an exemplary flowpath assembly 464 for a gas turbine engine. The flowpath assembly 464 can be incorporated into any of the flowpath assemblies and sections disclosed herein. The assembly 464 can include a plurality of seal members 474 to establish primary and secondary sealing relationships with an outer periphery 463OP of a respective vane 463 to limit fluid flow between a first plenum 471 and a gas path GP. The seal members 474 can include a first (e.g., primary) seal member 474-1 and a second (e.g., secondary) seal member 474-2. The first seal member 474-1 can be a rope seal, and the second seal member 474-2 can be a wedge seal, for example. The first seal member 474-1 can have a relatively lesser stiffness, rigidity and/or conformance than the second seal member 474-2, and may be be utilized without pressure matching to situate the first seal member 474-1.

A spring member 475 can be dimensioned to seat or bias a sloped face 474SF of the seal member 474-2 against a sloped face 468SF of the arc segment 468 such that the seal member 474-2 is urged against the outer periphery 463OP of the vane 463 to establish a sealing relationship. Biasing the seal member 474-2 inwardly can cause the seal member 474-2 to seat against a main body 468A of the arc segment 468 to establish a sealing relationship. The first seal member 474-1 can be trapped between the main body 468A of the arc segment 468 and the second seal member 474-2 such that biasing the seal member 474-2 inwardly causes the first seal member 474-1 to seat against the main body 468A of the arc segment 468.

Figures 10, 10A:
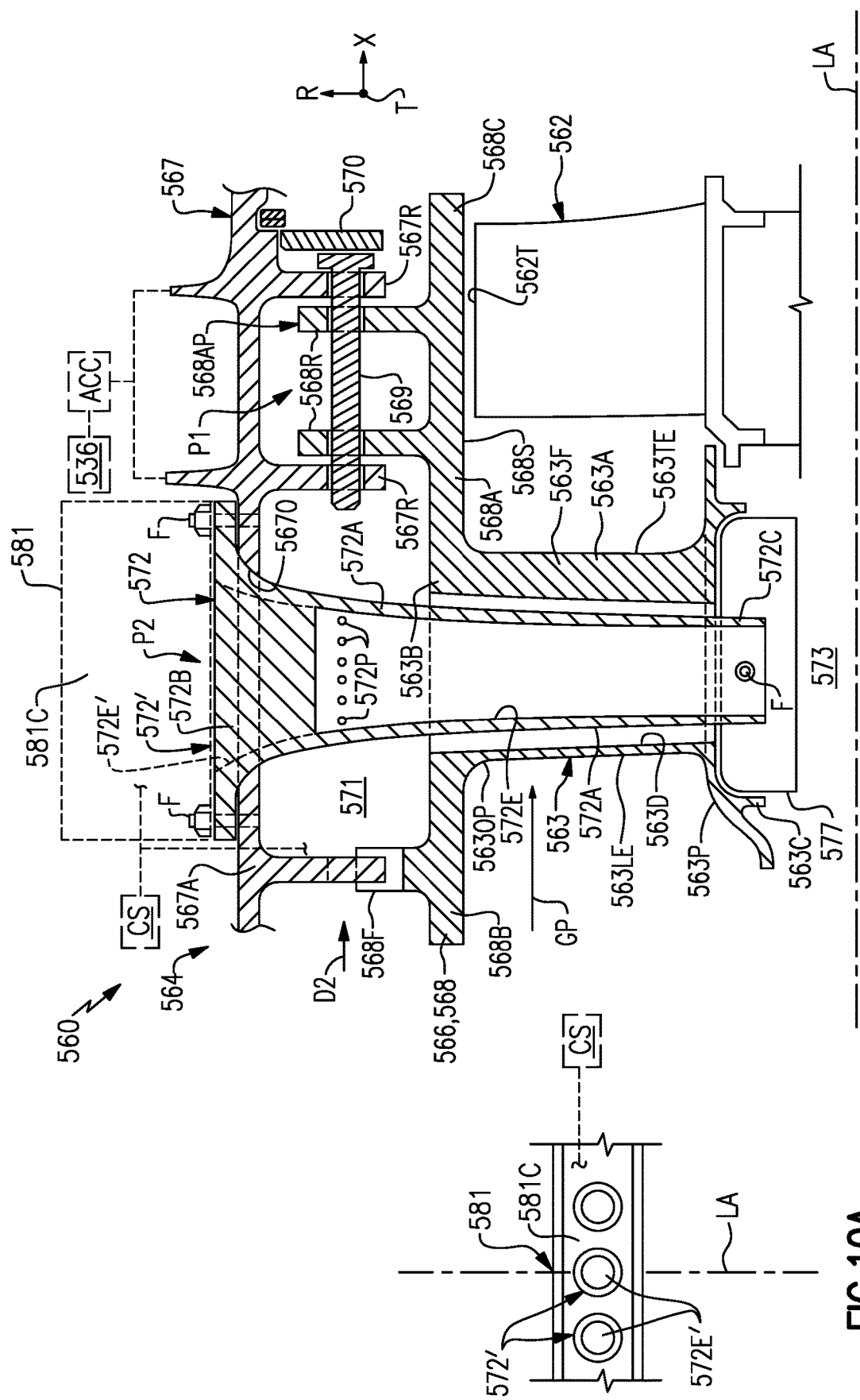
FIG. 10 illustrates another exemplary section of a gas turbine engine including a flowpath assembly.
FIG. 10A illustrates a cooling scheme for a section of a gas turbine engine.

FIG. 10 illustrates an exemplary section 560 including a flowpath assembly 564. The assembly 564 can include an end wall 566 including an array of arc segments 568, an array of vanes 563 and an array of spar members 572.

Portions of each vane 563 can be integrally formed with the end wall 566. Each vane 563 can include a fairing 563F that establishes an airfoil section 563A and a platform section 563P of the vane 563. The airfoil section 563A can be integrally formed with a main body 568A of a respective one of the arc segments 568. Each arc segment 568 can be integrally formed with a first end section 563B established by the fairing 563F of one or more vanes 563, which may be utilized such that a separate seal member to seal along an outer periphery 563OP of the vane 563 can be omitted thereby reducing complexity and leakage. the fairing 563F and arc segments 568 can be made of any of the materials disclosed herein, including ceramic materials such as a CMC material.

The section 560 can include an arcuate housing 581 dimensioned to extend about the array of arc segments 568. The housing 581 can have a generally rectangular cross sectional geometry. The housing 581 can include an inner cavity (or plenum) 581C coupled to a coolant source CS. The inner cavity 581C can be dimensioned to interconnect the coolant source CS and an inner cavity 572E' of one or more of the spar members 572 of the end wall 566, as illustrated by the cooling scheme of FIG. 10A. In other examples, the housing 581 is omitted and the inner cavity 572E of the spar member 572 is coupled to the coolant source CS through the plenum 571.

Figure 11:
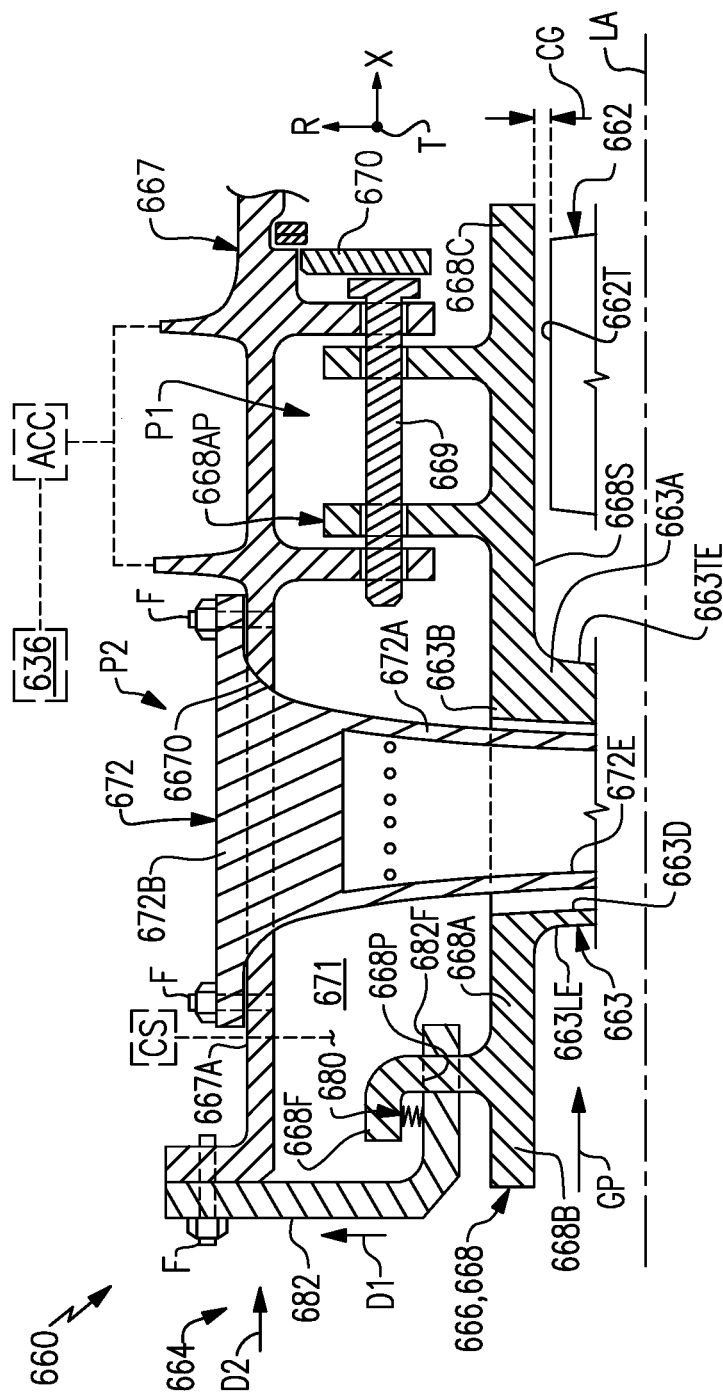
FIG. 11 illustrates another exemplary section of a gas turbine engine including a flowpath assembly.

FIG. 11 illustrates an exemplary section 660 including a flowpath assembly 664. The assembly 664 can include an end wall 666 including an array of arc segments 668, an array of vanes 663 and an array of spar members 672.

Each arc segment 668 can include one or more flanges 668F. Each flange 668F may extend outwardly from a main body 668A of the arc segment 668. The section 660 can include a housing 682 fixedly attached or otherwise secured to static structure 636. The housing 682 can be fixed attached to case 667 utilizing one or more fasteners F. The housing 682 can include one or more flanges 682F moveable in a direction D2 and at least partially into a passage (or opening) 668P of the flange 668F such that each flange 682F axially overlaps or otherwise opposes the flange 668F of a respective one of the arc segments 668. The passage 668P can be dimensioned to limit or permit relative radial and/or circumferential movement between the flange 668F and flange 682F relative to the longitudinal axis LA.

The assembly 664 can include one or more spring members 680 trapped or otherwise positioned between an opposing pair of the flanges 668F, 682F. The spring member 680 can be dimensioned to extend circumferentially about the longitudinal axis LA. The spring member 680 can be contiguous or can include one or more segments. Each spring member 680 can be dimensioned to bias the first end portion 668B of the arc segment 668 radially outward relative to the longitudinal axis LA. The spring member 680 can serve to provide a predetermined amount of radial stiffness to a cantilevered portion of the arc segment 668. The predetermined amount of radial stiffness may correspond to a predetermined spring bias of the spring member 680. The radial stiffness feature can reduce bending and can reduce variation in a distance between a seal face 668S of the arc segment 668 and the longitudinal axis LA, which can improve efficiency by reducing variation of a clearance gap CG established between the seal face 668S and airfoils 662. The predetermined spring bias of the spring member 680 can be selected such that the spring member 680 provides a radial reaction force that is between approximately 70 percent and approximately 95 percent of a peak total radial aerodynamic load acting on the arc segment 668 and vane 663 axially forward of the first attachment portion 668AP relative to the longitudinal axis LA in operation.

FIG. 12 illustrates an exemplary section 760 including a flowpath assembly 764 for a gas turbine engine. The assembly 764 can include an array of vanes 763, an array of spar members 772, and an end wall 766 including an array of arc segments 768. An array of rotatable airfoils or blades 762 are shown in dashed lines for illustrative purposes. Each arc segment 768 can accommodate various quantities of airfoil sections 763A and spar bodies 772A of the spar members 772, including only one airfoil section 763A and/or only one spar body 772A, or more than one airfoil section 763A and/or more than one spar body 772A, such as a quantity of 2, 3, 4, or even more airfoil sections 763A and spar bodies 772A. Each arc segment 768 can be axially and circumferentially aligned with one or more airfoil sections 763A of the vanes 763 and/or one or more spar bodies 772A of the spar members 772 relative to a longitudinal axis LA, including any of the quantities disclosed herein, such as two airfoil sections 763A and two spar bodies 772A as illustrated in FIG. 12. Each arc segment 768 can have two or more spar members 772 passing through a main body 768A of the arc segment 768. The arc segment 768 can be coupled to the vanes 763. The arc segments 768 can be integrally formed with one or more adjacent vanes 763 or can be separate and distinct components. For example, each arc segment 768 can include two or more openings 7680 (shown in dashed lines for illustrative purposes) established in a main body 768A of the arc segment 768. Each of the openings 7680 can be dimensioned to at least partially receive a respective airfoil section 763A and spar body 772A such that the arc segment 768 is radially aligned with at least two vanes 763 and at least two spar members 772 relative to the longitudinal axis LA. The array of arc segments 768 can be axially aligned with a single row of the vanes 763 and a single row of the blades 762, as illustrated in FIG. 12. The first end portion 768B of the arc segment 768 can be positioned axially aft of at least one row of the rotatable blades 762 in the section 760.

Each of the arc segments 768 can extend in a circumferential or thickness direction T between a first mate face 768M-1 and a second mate face 768M-2. The first mate face 768M-1 can be dimensioned to establish an intersegment gap IG with the second mate face 768M-2 of an adjacent one of the arc segments 768. In an assembled position, the first mate face 768M-1 circumferentially opposes an adjacent second mate face 768M-2. At least the airfoil section 763A of each vane 763 can be circumferentially offset from the mate faces 768M of the respective arc segment 768.

The assembly 764 can include one or more seal members 784 dimensioned to establish a sealing relationship along the intersegment gap IG between the mate faces 768M-1, 768M-2 of opposed arc segments 768. The seal member 784 can be a feather seal having a generally rectangular or planar geometry, as illustrated in FIG. 13. The seal member 784 can comprise any of the materials disclosed herein, including metallic and ceramic matrix composite (CMC) materials. The mate faces 768M-1, 768M-2 can include respective slots 768MS dimensioned to receive a respective one of the seal members 784 such that the seal member 784 spans across the intersegment gap IG to establish a sealing relationship. The assembly 764 of FIG. 12 can be utilized to reduce a total number of intersegment gaps IG established by the end wall 666 (e.g., at least half), which can reduce leakages and improve efficiency.

Figure 14:
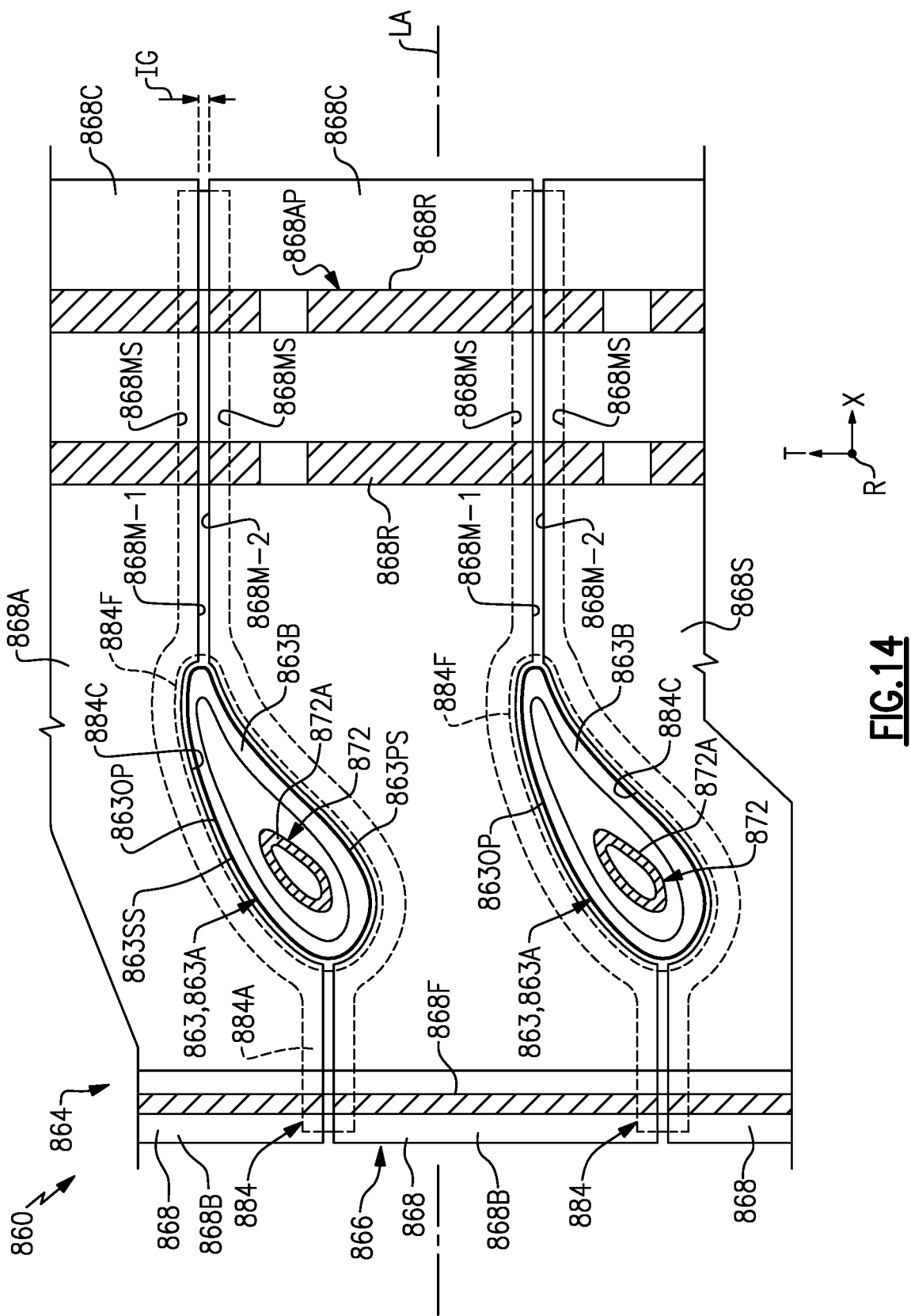
FIG. 14 illustrates a plan view of another exemplary section of a gas turbine engine including a flowpath assembly.

FIG. 14 illustrates an exemplary section 860 including a flowpath assembly 864 for a gas turbine engine. The assembly 864 can include an end wall 866 including an array of arc segments 868, an array of vanes 863 and an array of spar members 872. The arc segments 868 can be arranged in an annulus about an array of rotatable airfoils or blades (see, e.g., FIG. 12). The arc segment 868 can be coupled to the vanes 863. The arc segments 868 can be integrally formed with one or more of the vanes 863, or can be separate and distinct components as illustrated in FIG. 14. Each of the arc segments 868 can extend in a circumferential or thickness direction T between a first mate face 868M-1 and a second mate face 868M-2.

The assembly 864 can include one or more seal members 884 dimensioned to establish a sealing relationship along an intersegment gap IG established between the mate faces 868M of opposed arc segments 868, as illustrated by the mate faces 868M-1, 868M-2. The seal member 884 can be a feather seal and can comprise any of the materials disclosed herein, including a metallic material or a ceramic matrix composite (CMC) material. The seal member 884 can have a unitary construction or can include two or more segments (e.g., halves) mechanically attached or otherwise secured to each other. The mate faces 868M-1, 868M-2 can include respective slots 868MS dimensioned to receive a respective one of the seal members 884 such that the seal member 884 spans across the intersegment gap IG to establish a sealing relationship.

Figure 15:
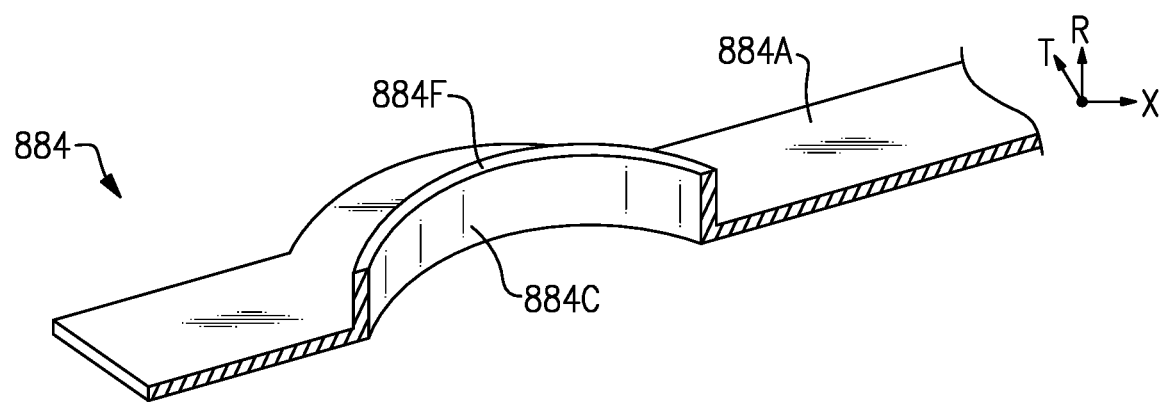
FIG. 15 illustrates a seal member that may be incorporated into the flowpath assembly of FIG. 14.

Each seal member 884 can be dimensioned to establish a sealing relationship with an outer periphery 8630P of the airfoil section 863A of a respective one of the vanes 863. The seal member 884 can include a main body 884A and a flange 884F extending radially outwardly from the main body 884A, as illustrated in FIG. 15. The seal member 884 can include a circumferential face 884C established along the flange 884F. The circumferential face 884C can be dimensioned to substantially follow the outer periphery 8630P of the airfoil section 863A to establish the sealing relationship with the respective vane 863, including along a pressure side 863PS and/or suction side of 863SS the airfoil section 863A. The seal member 884 may be utilized such that a separate rope seal, spring plate and/or spring member is omitted.

The disclosed flowpath assemblies can incorporate an endwall utilized to bound a gas path through the gas turbine engine. The disclosed assemblies may improve sealing effectiveness and reduce parts counts by utilizing an integral platform section and BOAS. The integral platform section and BOAS can be utilized to omit an axial purge gap and reduce purge, leakage, and cooling flow requirements along the adjacent gas path. The assemblies may be utilized to establish sealing relationships with components incorporating CMC materials, which may otherwise be associated with additional leak paths and increased effective leakage per interface location, and variability due to interaction between CMC components and metallic components. The number of mate faces established by the end wall may be reduced, which can further reduce leakage flow and improve efficiency.

Mounting the arc segments adjacent to the rotating blades at the first attachment point may reduce an impact on tip clearances of the adjacent blades as compared to cantilevering or mounting the arc segments at a position axially forward of the adjacent blades. Additionally, mounting schemes for the end wall at the first attachment point can be axially aligned with ACC rails of the respective case which can improve effectiveness of a case-blown ACC system.

It should be understood that relative positional terms such as "forward," "aft," "upper," "lower," "above," "below," and the like are with reference to the normal operational altitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An assembly for a gas turbine engine comprising:
an end wall including a main body extending between a first end portion and a second end portion to establish a seal face that bounds a gas path, the seal face dimensioned to establish a clearance gap with a rotatable blade along the gas path, and the end wall including a first attachment portion dimensioned to fixedly attach the main body to a static structure at a first attachment point;
an airfoil extending radially inwardly from the end wall relative to an assembly axis, the airfoil including an inner cavity extending between a first end portion and a second end portion, the first end portion adjacent the end wall of the airfoil; and
a spar member including a spar body extending between a first end portion and a second end portion, the spar body extending at least partially through the inner cavity, the first end portion of the spar member attachable to the static structure at a second attachment point axially between the first end portion of the end wall and the first attachment portion such that the first end portion of the end wall is cantilevered from the first attachment point.

2. The assembly as recited in claim 1, wherein the airfoil includes a fairing integrally formed with the end wall, and both the fairing and the end wall comprise a ceramic matrix composite (CMC) material.

3. The assembly as recited in claim 1, further comprising a spring member dimensioned to bias the first end portion of the end wall radially outwardly relative to the assembly axis.

4. The assembly as recited in claim 1, wherein the static structure includes a case dimensioned to extend circumferentially about the end wall relative to the assembly axis, the end wall is attachable to the case at the first attachment point, the first end portion of the spar member is attachable to the case at the second attachment point, and the second attachment point is axially spaced apart from the first attachment point relative to the assembly axis.

5. The assembly as recited in claim 4, wherein the end wall includes a flange that extends radially outwardly from the first end portion of the end wall relative to the assembly axis, and the flange is dimensioned to establish a spline interface with the first end portion of the spar member.

6. The assembly as recited in claim 1, wherein the airfoil includes a fairing, the fairing includes an airfoil section extending from a platform section, and the platform section radially opposes the end wall with respect to assembly axis.

7. The assembly as recited in claim 6, wherein the end wall includes a circumferential face dimensioned to at least partially surround an outer periphery of the airfoil section.

8. The assembly as recited in claim 6, wherein the fairing is integrally formed with the end wall.

9. The assembly as recited in claim 6, wherein the spar member includes an inner cavity dimensioned to convey cooling flow from a coolant source to a plenum radially inwardly of the platform section relative to the assembly axis.

10. The assembly as recited in claim 6, wherein the airfoil section is moveable relative to the spar member.

11. The assembly as recited in claim 10, further comprising a spring member dimensioned to bias the first end portion of the end wall radially outwardly relative to the assembly axis.

12. The assembly as recited in claim 11, further comprising:
a spring plate; and
a seal member captured between the spring plate and the end wall to establish a sealing relationship with an outer periphery of the airfoil section.

13. The assembly as recited in claim 12, further comprising:
a spring member that biases the spring plate and the seal member against the main body of the end wall such that the seal member is trapped between the spring plate and the main body of the end wall;
wherein the spring plate and the seal member circumscribe a perimeter of the outer periphery of the airfoil section and a perimeter of the spar body of the spar member.

14. The assembly as recited in claim 6, wherein:
the end wall includes an opening defined through a thickness of the main body; and
the spar body and the airfoil section extend through the opening such that the first end portion of the spar member and the first end portion of the airfoil are radially outward of the opening relative to the assembly axis.

15. The assembly as recited in claim 1, wherein the airfoil is a turbine vane, and the rotatable blade is a turbine blade.

16. A gas turbine engine comprising:
a section including an array of blades rotatable in a gas path about a longitudinal axis;
an end wall including an array of arc segments arranged circumferentially about the array of blades relative to the longitudinal axis, each of the arc segments including a main body extending in an axial direction between a first end portion and a second end portion relative to the longitudinal axis to establish a seal face that bounds the gas path, the seal face dimensioned to establish a clearance gap with the blades, and each of the arc segments including a first attachment portion fixedly attached to a static structure at a first attachment point such that the first end portion of the arc segment is cantilevered from the first attachment point;
an array of vanes adjacent to the array of blades, wherein the vanes extend inwardly from the seal face of a respective one of the arc segments and at least partially across the gas path; and
an array of spar members fixedly attached to the static structure, wherein each of the spar members extends at least partially through an inner cavity of a respective one of the vanes.

17. The gas turbine engine as recited in claim 16, wherein each of the arc segments comprises a ceramic material.

18. The gas turbine engine as recited in claim 16, wherein the arc segments are moveable in a radial direction relative to the spar members with respect to the longitudinal axis.

19. The gas turbine engine as recited in claim 18, wherein each of the spar members includes an inner cavity dimensioned to convey cooling flow from a coolant source to a plenum radially inward of the respective vane relative to the longitudinal axis.

20. The gas turbine engine as recited in claim 16, wherein each of the vanes includes an airfoil section and a platform section that bounds the gas path, the airfoil section extending radially between the platform section and the respective arc segment relative to the longitudinal axis.

21. The gas turbine engine as recited in claim 20, wherein the airfoil section is integrally formed with the main body of a respective one of the arc segments.

22. The gas turbine engine as recited in claim 21, further comprising:
  at least one spring member dimensioned to bias a first end portion of the respective one of the arc segments radially outwardly relative to the longitudinal axis; and
  wherein the at least one spring member is dimensioned to provide a radial reaction force that is between approximately 70 percent and approximately 95 percent of a peak total radial aerodynamic load acting on the respective one of the arc segments and a respective one of the vanes axially forward of the first attachment portion relative to the longitudinal axis in operation.

23. The gas turbine engine as recited in claim 20, further comprising:
  a plurality of seal members dimensioned to establish a sealing relationship with an outer periphery of a respective one of the airfoil sections; and
  wherein each of the arc segments extends in a circumferential direction between a first mate face and a second mate face with respect to the longitudinal axis, the first mate face dimensioned to establish an intersegment gap with the second mate face of an adjacent one of the arc segments, and the first and second mate faces including respective slots dimensioned to receive a respective one of the seal members such that the seal member spans across the intersegment gap.

24. The gas turbine engine as recited in claim 20, wherein each of the arc segments includes a plurality of openings, and each of the openings at least partially receives a spar body of a respective one of the spar members and the airfoil section of a respective one of the vanes such that the arc segment is radially aligned with at least two of the spar members and at least two of the vanes relative to the longitudinal axis.

25. The gas turbine engine as recited in claim 24, wherein each of the openings circumscribes a perimeter of the spar body of the respective one of the spar members and circumscribes a perimeter of the airfoil section of a respective one of the vanes.

* * * * *